United States Patent [19]

Oishi et al.

[11] Patent Number: 4,570,877
[45] Date of Patent: Feb. 18, 1986

[54] MAGNETIC TAPE CASSETTE

[75] Inventors: Kengo Oishi; Masayoshi Moriwaki, both of Kanagawa, Japan

[73] Assignee: Fuji Photo Film Co., Ltd., Kanagawa, Japan

[21] Appl. No.: 645,960

[22] Filed: Aug. 31, 1984

[30] Foreign Application Priority Data

Sep. 7, 1983 [JP] Japan .................... 58-138613[U]

[51] Int. Cl.⁴ .................... G03B 1/04; G11B 15/32
[52] U.S. Cl. .................... 242/199; 360/132
[58] Field of Search ............... 242/197–200, 242/192; 206/387, 389, 391, 393; 360/132, 137

[56] References Cited

U.S. PATENT DOCUMENTS

| | | | |
|---|---|---|---|
| 3,923,272 | 12/1975 | Pertzsch et al. | 242/199 |
| 4,174,080 | 11/1979 | Yamada | 242/199 |
| 4,333,620 | 6/1982 | Ishida et al. | 242/199 |
| 4,438,892 | 3/1984 | Fitterer et al. | 242/199 |

Primary Examiner—Leonard D. Christian
Attorney, Agent, or Firm—Sughrue, Mion, Zinn, Macpeak & Seas

[57] ABSTRACT

A pair of friction sheets loosely disposed between the opposite end faces of wind-up cores and the inner surfaces of a cassette casing in a magnetic tape cassette are loosely engaged with posts of rotatable guide rollers and guide pins in the cassette so that the opposite side edges of the magnetic tape may be guided by the friction sheets substantially throughout its path and the tape may be fed in a stable manner. Engaging portions of the friction sheets may have protruded portions protruded toward the inner surfaces of the casing to guide the tape with sufficient friction. When the magnetic tape cassette is put into a cassette tape recorder, the tape travels stably with respect to the magnetic head of the recorder.

2 Claims, 4 Drawing Figures

MAGNETIC TAPE CASSETTE

BACKGROUND OF THE INVENTION

1. Field of the Invention

This invention relates to a magnetic tape cassette used for recording and reproducing sounds or the like, and more particularly to a magnetic tape cassette in which relative positional slippage between a magnetic tage and a tape recorder using said tape is minimized.

2. Description of the Prior Art

Discs (so-called records) and magnetic tapes are commonly used for recording and/or reproducing sounds or the like. The magnetic tapes are widley used for both recording and reproduction since information recorded on a magnetic tape can easily be erased for reuse, whereas the discs in general are used only for reproduction. Among the magnetic tapes, a so-called compact magnetic tape cassette has come into wide use because of its handiness and compactness.

When a magnetic tape is used for recording sounds, the sounds are generally converted to analog signals which are then recorded on the magnetic tape. During reproduction, on the other hand, said signals are read out from the magnetic tape and reproduced into sounds by use of an amplifier and a speaker connected thereto.

Recently, however, digital signals which are not easily affected by noises and which have a high signal-to-noise ratio have become to be used as substitute for analog signals to improve sound quality in transmission, recording and reproduction. Better sound quality is obtained by use of the digital signals since signal-to-noise ratio can be improved by processing the digital signal. Morever, in the case as in the transmission through a broadcating satellite wherein analog signals are likely to be affected by noises, noiseless high fidelity sounds can be transmitted by use of digital signals since errors can be corrected in the digital signals. Accordingly, the use of digital signals in the sound transmission field is widely spreading. In case that digital signals are used in sound transmittion, means for recording and reproducing said signals would also be needed. Even in this case, discs, magnetic tapes and the like are commonly used, and, among others, the magnetic tape cassette is preferably used because of its compactness and handiness as is in analog signal recording and reproduction.

A recording area which covers a frequency band on the order of 100 KHz is necessary in digital signal recording, whereas of frequency band on the order of 100 KHz is sufficient for analog signal recording. That is, in case where a magnetic tape is used in sound recording by means of digital signals, which case is commonly called DAT (Ditital Audio Tape) recording process, a frequency band on the order of 100 KHz should be recorded on the magnetic tape on which a frequency band on the order of 10 KHz has conventionally been recorded.

Therefore, in order to expand the available frequency band, a helical rotary head recording system in which the recording and reproducing head is rotated, and a multitrack fixed head recording system in which an increased number of recording and reproducing tracks are employed, have come into use. Since the helical rotarty head is of the same type as that used for VTR's of which recording capacity may extend to a band on the order of 5 MHz, there exists substantially no problem with respect to recording of a frequency band on the order of 100 KHz. In case of the multitrack fixed head recording system, about then tracks are needed for the DAT recording of a frequency band on the order of 100 KHz since the recording capacity of one track thereof is restricted to a frequency band in the range of about 10–15 KHz due to limitation in the recorded wavelength. Further, when a dynamic range and error correction are taken account of, the number of tracks needed would increase up to 14–20. For the double-side recording, the number of the tracks would generally be doubled. In practice, the use of 36 tracks (18 tracks for each side) has been proposed. When a conventional compact tape cassette is used in a 36-track fixed head recorder, 36 tracks would have to exist in a tape width of 3.81 mm. Thus, the width of one track would become only about 100 μm. In the DAT, the relative positional relationship between a head and a tape becomes very critical since the tape width for one track is as narrow as about 100 μm; whereas in the conventional analog recording, it is not necessary to maintain said relationship due to large tape width for one track, for monaural recording uses only two tracks (one track for each side) and stereo recording uses only four tracks (two tracks for each side).

The slippage between a head and a tape mainly results from change in the tape path due to swinging of tape wind-up cores and/or rotatable guide rollers which occurs in a gap between the tape wind-up cross and a cassette casing as well as between rotatable guide rollers and the cassette casing. Particularly, when the tap feeding speed is changed, e.g., from the normal play back to the fast forwarding, the change in tension of the tape would affect the positions of the wind-up cores and/or the rotatable guide rollers, so that the tape path is likely to become unstable.

Thus, to prevent the slippage between the head and the tape, it is necessary to reduce the influence of the tape tension change at the feeding speed change by eliminating the swinging of the tape wind-up cores and/or the rotatable guide rollers or by providing more or less back tension to the tape when the tape is used. Accordingly, in general, a pair of friction sheets are loosely disposed on and under the tape wind-up cores to limit the fluctuation of the tape and to provide back tension thereto. In a conventional magnetic tape cassette, however, the friction sheets are merely disposed in the lower and upper sides of the tape wind-up cores. That is, the top and the bottom of each post of the fixed guide rollers and of the fixed guide pins are not covered. Accordingly, the tape path becomes so unstable that the tape cannot be uniformly wound up on a tape wind-up core. Thus, when the opposite side of the cassette is used, the delivery point of the tape becomes too unstable to fix the tape path, which results in undersirable slippage between the tape and the magnetic head.

SUMMARY OF THE INVENTION

In view of the foregoing problems, the primary object of the present invention is to provide a magnetic tape cassette which stabilizes the tape path thereof so that the slippage between the tape and the magnetic head is prevented.

Another object of the present invention is to provide a magnetic tape cassette which regulates the position of the tape therein so that the tape is wound up uniformly.

The magnetic tape cassette of the present invention comprises a cassette casing made of an upper half and a lower half; a pair of wind-up cores for winding up a magnetic tape provided in said casing; rotatable quide rollers and fixed guide pins which guide said tape in said casing; and a pair of friction sheets loosely disposed between said cores and the inner wall of said upper half and between said cores and the inner wall of said lower half respectively; in which the friction sheets are loosely held at the top and bottom of each post of both rotatable guide rollers and fixed guide pins as well as top and bottom of said pair of wind-up cores, so that the position of the tape can be regulated throughout the tape path. In a preferred embodiment of the present invention, the friction sheets are partly protruded toward the inner wall of said casing at the portions where each of said posts of the rotatable guide rollers and the guide posts are loosely engaged therewith, i.e., the portion around the engaging openings, so that the position of the tape path would be more effectively regulated.

Thus, in accordance with the present invention, since the friction sheets are disposed to cover each post of both the rotatable guide rollers and the fixed guide pins as well as the wind-up cores, the positional regulation can be achieved throughout the tape path from one of the tape wind-up cores to the other by way of penings in the cassette casing, so that the tape can be uniformly wound up. Thus, the slippage between the tape and the head can be prevented in recording and reproduction. Further, in accordance with the preferred embodiment of the present invention, in which outwardly protruded portions are formed in portions of the friction sheets where each of said post is loosely engaged thereto, the vertical positional regulation of the tape becomes more effective since the friction sheets stand close to the tape, and the slippage of the friction sheets in the direction parallel to the upper and lower sides of the cassette casing can also be prevented.

DESCRIPTION OF THE PREFERRED EMBODIMENT

Figure 1:
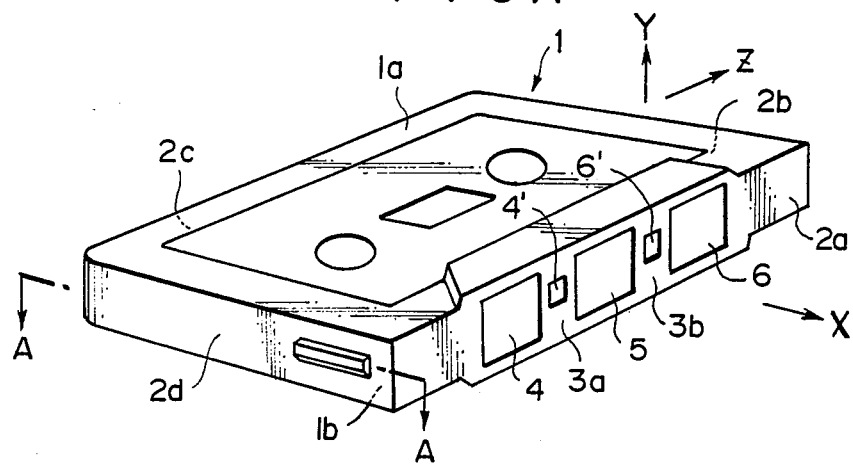
FIG. 1 is a perspective view of a magnetic tape cassette in accordance with an embodiment of the present invention.

FIG. 1 is a perspective view of a magnetic tape cassette in accordance with an embodiment of the present invention. As shown in FIG. 1, a cassette casing 1, which is substantially a rectangular flat box shape, consists of an upper half 1a and a lower half 1b which join together at four sides 2a, 2b, 2c and 2d. Among the four sides, the front side 2a has openings 4, 5 and 6 separated by front walls 3a and 3b having small openings 4' and 6'. For the convenience of the description hereinafter; the direction (of the arrow X) perpendicular to the side 2a having openings 4, 5 and 6 is defined as the front-and-rear direction; the direction (of the arrow Y) perpendicular to both the upper half 1a and the lower half 1b is defined as the up-and-down direction; the direction (of the arrow Z) perpendicular to both of the above-defined directions is defined as the right-and-left direction; and the sides 2a, 2b, 2c and 2d are defined as the front side, the right side, the rear side and the left side, respectively.

Figure 2:
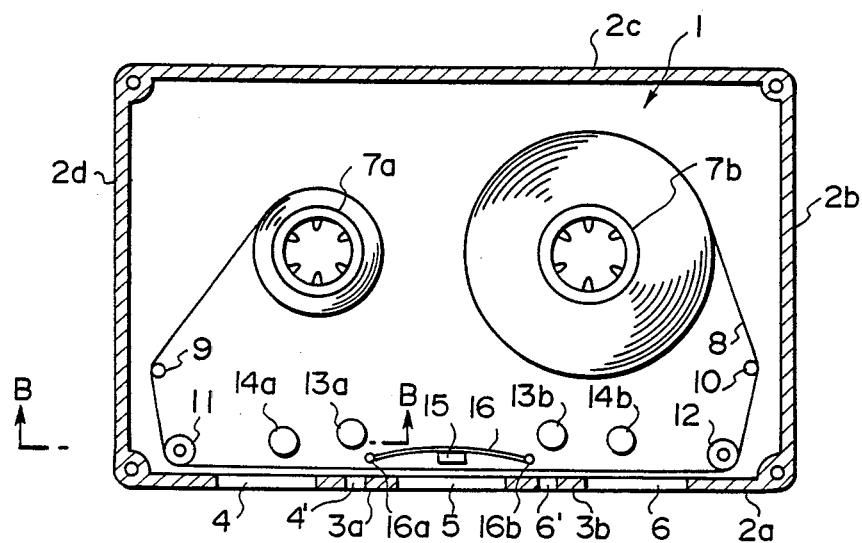
FIG. 2 is a cross sectional view of the cassette shown in FIG. 1 taken along the line A—A thereof.

FIG. 2 is a cross sectional view of the cassette shown in FIG. 1 taken along a plane which is parallel to the upper half 1a and which passes through nearly the center portion of the cassette as designated by the line A—A. In the cassette casing 1, a pair of wind-up cores 7a and 7b are disposed rotatably in the casing 1. A magnetic tape 8 is wound up, in the reverse direction to each other, on both of the wind-up cores 7a and 7b to which ends thereof are attached. As is described hereinbefore, the cassette casing 1 is substantially a rectangular flat box shape consisting of the rectangular sides 2a, 2b, 2c and 2d; which surround a pair of the wind-up cores 7a and 8b; the upper half 1a (on this side of the paper); and the lower half 1b (on the other side of the paper). In the front side 2a, the openings 4, 4', 5, 6' and 6, into which a pinch roller, a head and a tape guide of a tape recorder (not shown) would be inserted, are formed.

Also, in the cassette casing 1, fixed cylindrical guide pins 9 and 10 each having the post in the up-and-down direction, which guide the tape 8 wound up on the wind-up cores 7a and 7b are disposed in the vicinity of the sides 2d and 2b, respectively. Further, near the left and the right corners in the front portion of the cassette casing 1, rotatable guide rollers 11 and 12 each having the rotating axis in the up-and-down direction are rotatably disposed respectively. Thus, the tape 8 wound up on the wind-up core 7a is outwardly guided by the fixed guide pin 9 and the rotatably guide roller 11, then guided along the front side 1a toward the rotatable guide roller 12, and finally wound up on the wind-up core 7b through the rotatable guide roller 12 and the fixed guide pin 10. In the upper half 1a and the lower half 1b, guide openings 13a and 13b, into which two fixed pins projecting from the tape recorder would be inserted, and capstan receiving openings 14a and 14b, into which the capstan of the tape recorder would be inserted, are provided vertically penetrating both of said halves 1a and 1b. Further, in the vicinity of the magnetic head receiving opening 5, there is provided a pad 16 consisting of a leaf spring and a felt 15 attached thereto for pressing the tape against the head. Both ends of the pad 16 are supported by support pins 16a and 16b, respectively, both ends of said pins 16a and 16b being fixed in the cassette casing 1. The tape 8 guided along the front side 2a of the cassette casing 1 is guided through the space between the front walls 3a and 3b and the support pins 16a and 16b so that it is positioned ahead of the openings 14a and 14b in the lower half 1b. Thus, when the cassette is used (on recording or reproduction), the capstan (not shown) projects from the opening 14a or 14b into the rear side of the tape 8; so that the tape is held between the pinch roller (not shown), which is inserted through the opening 4 or 6, and the capstan, and it is fed by the rotation of said capstan. At the same time, a magnetic head is inserted from the opening 5 to be pressed against the tape 8 by means of the felt 15 attached to the pad 16 supporting the tape 8 from behind to carry out recording and reproduction of information on and from the tape 8.

Between the upper half 1a and the upper end of the wind-up cores 7a and 7b, and between the lower half 1b and the lower end of said wind-up cores, a pair of friction sheets which are the characterizing elements of the present invention are loosely disposed. The friction sheet is described in detail with reference to FIGS. 3 and 4.

Figure 3:
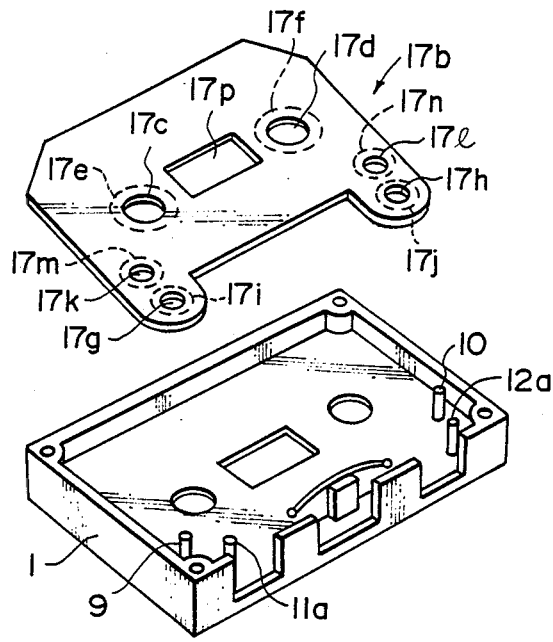
FIG. 3 is a broken perspective view showing how a friction sheet is disposed in a half of the cassette casing in accordance with the embodiment of the present invention.
Figure 4:
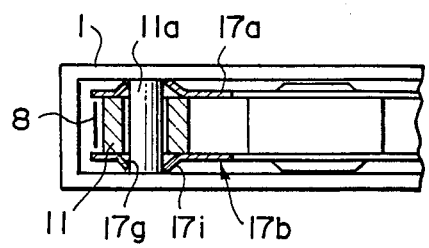
FIG. 4 is a cross sectional view taken along the line B—B of FIG. 2 showing the cassette casing and the friction sheets disposed therein in accordance with the embodiment of the present invention.

FIG. 3 is a broken perspective view showing how a friction sheet 17b is disposed in the cassette casing, 1 and FIG. 4 is a cross sectional view showing the cassette casing 1 and friction sheets 17a and 17b disposed therein taken along the line B—B of the FIG. 2. As is shown in FIG. 4, the friction sheets 17a and 17b cover integrally the wind-up cores 7a and 7b, the posts 11a and 12a of the rotatable guide rollers 11 and 12, and the fixed guide pins 9 and 10, downwardly and upwardly, respectively. Since the pair of friction sheets 17a and 17b are totally the same in shape and symmetrical with respect to the up-and down direction each other, and only the shape of the lower friction sheet 17b is described hereinbelow. The portions of the friction sheet 17b where the wind-up cores 7a and 7b come into contact therewith have openings 17c and 17d through which bottoms of posts of said cores 7a 7b extend, respectively. Around the peripheries of said openings 17c and 17d, downwardly protruded portions 17e 17f are respectively formed. Similarly, openings 17g and 17h, and protruded portions 17i and 17j are respectively formed at the portions of the friction sheet 17b where the posts 11a and 12a come into contact therewith; while openings 17k and 17l, and protruded portions 17m and 17n are respectively formed at portions of said friction sheet 17b where the fixed guide pins 9 and 10 come into contact therewith. Also, at the center portion of the friction sheet 17b is formed a window 17p through which the tape 8 can be observed from outside. The upper friction sheet 17a has the same form as the above-described lower friction sheet 17b.

In the magnetic tape cassette of the present invention constructed as above, all the tops and the bottoms of the wind-up (feeding) core 7a, the fixed guide pin 9, the rotatable guide roller 11, the rotatable guide roller 12, the fixed guide pin 10, and the wind-up core 7b are loosely covered with the upper friction sheet 17a and the lower friction sheet 17b; so that the posts of the above-mentioned elements may project through the openings 17c, 17d, 17h, 17k, 17l and the like which are formed in the portions of the friction sheets 17a and 17b where said posts come into contact therewith, while the protruded portions 17e, 17f, 17i, 17j, 17m, and 17n and the like fix the position of a pair of said friction sheets 17a and 17b as well as make said friction sheets 17a and 17b come into contact with upper and lower sides of the tape 8. Thus, the positional regulation of the tape 8 and the addition of back-tension thereto are achieved throughout the tape path, so that the tape path can be stabilized to uniformly wind up the tape.

Although the protruded portions are formed around all of the openings in the foregoing embodiment, they may as well be formed around any pair or pairs of the openings.

We claim:

1. A magnetic tape cassette comprising a pair of tape wind-up cores, a tape which is wound up on said cores, a cassette casing having lower and upper halves which retains said tape and said cores therein, at least one pair of rotatable guide rollers provided in said casing, at least one pair of fixed guide pins each provided on a tape path between one of said cores and one of said guide rollers, and a pair of friction sheets loosely disposed between the top of said cores and the inner wall of the upper half of said casing and between the bottom of said cores and the inner wall of the lower half of said casing, respectively, wherein the improvement comprises said friction sheets having such a size as to cover the posts of said guide rollers and said guide pins, and having engaging openings loosely engaged with said posts.

2. A magnetic tape cassette as defined in claim 1 in which at least one pair of said engaging openings in said friction sheets have protruded portions therearound protruded toward the innerwalls of said cassette casing.

* * * * *